(12) United States Patent
Li et al.

(10) Patent No.: US 12,547,031 B2
(45) Date of Patent: Feb. 10, 2026

(54) DIRECT-LIT BACKLIGHT MODULE, METHOD OF DESIGNING BACKLIGHT MODULE AND DISPLAY DEVICE

(71) Applicant: Shanghai Tianma Micro-electronics Co., Ltd., Shanghai (CN)

(72) Inventors: Xiongping Li, Shanghai (CN); Ronghua Li, Shanghai (CN); Hui Liu, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 0 days.

(21) Appl. No.: 18/625,155

(22) Filed: Apr. 2, 2024

(65) Prior Publication Data

US 2025/0044640 A1  Feb. 6, 2025

(30) Foreign Application Priority Data

Aug. 1, 2023 (CN) .......................... 202310961689.3

(51) Int. Cl.
*G02F 1/13357* (2006.01)
*G02F 1/1335* (2006.01)

(52) U.S. Cl.
CPC .. *G02F 1/133605* (2013.01); *G02F 1/133603* (2013.01); *G02F 1/133606* (2013.01); *G02F 1/133612* (2021.01)

(58) Field of Classification Search
CPC ......... G02F 1/133605; G02F 1/133603; G02F 1/133606; G02F 1/133612
See application file for complete search history.

(56) References Cited

U.S. PATENT DOCUMENTS 10,903,193 B2 * 1/2021 Yamada ................ F21V 7/0083
2018/0023784 A1 * 1/2018 Tamura ............. G02F 1/133611
362/235

(Continued)

FOREIGN PATENT DOCUMENTS

| CN | 102809119 A | 12/2012 |
|----|-------------|---------|
| CN | 112219060 A | 1/2021 |

(Continued)

*Primary Examiner* — Tsion Tumebo
(74) *Attorney, Agent, or Firm* — Anova Law Group, PLLC

(57) ABSTRACT

A direct-lit backlight module, a method of designing a backlight module and a display device are provided. The direct-light backlight module includes a substrate; an optical film layer; a reflector; and light-emitting elements. The substrate and the optical film layer are arranged oppositely; the light-emitting elements are arranged on a side of the substrate facing the optical film layer; the reflector is located between the substrate and the optical film layer and includes reflective structures surrounding the light-emitting elements; there is a gap between the reflective structures and the optical film layer, and there is air in the gap. In the thickness direction of the backlight module, a distance between one end of the reflective structure adjacent to the optical film layer and the optical film layer is OD1, and the distance between the substrate and the optical film layer is OD; and $$X = \frac{OD1}{OD};$$

and $0.4 \leq X < 0.6$.

18 Claims, 7 Drawing Sheets

(56) References Cited

U.S. PATENT DOCUMENTS

| | | | | |
|---|---|---|---|---|
| 2018/0217449 A1* | 8/2018 | Mifune | ............ | G02F 1/133605 |
| 2019/0124733 A1* | 4/2019 | Yamada | ................ | H01L 33/54 |
| 2020/0073174 A1* | 3/2020 | Yasunaga | ......... | G02F 1/133603 |
| 2020/0161516 A1* | 5/2020 | Sasaoka | .............. | G02B 5/1876 |
| 2020/0166804 A1* | 5/2020 | Zheng | .............. | G02F 1/133608 |
| 2021/0367116 A1* | 11/2021 | Eom | ................ | F21S 43/28135 |
| 2022/0137459 A1* | 5/2022 | Huang | .................... | F21S 8/00 |
| | | | | 362/97.1 |

FOREIGN PATENT DOCUMENTS

| | | |
|---|---|---|
| CN | 113359352 A | 9/2021 |
| CN | 114630991 A | 6/2022 |
| CN | 217238571 U | 8/2022 |

\* cited by examiner

DIRECT-LIT BACKLIGHT MODULE, METHOD OF DESIGNING BACKLIGHT MODULE AND DISPLAY DEVICE

CROSS-REFERENCE TO RELATED APPLICATION

This application claims the priority of Chinese Patent Application No. 202310961689.3, filed on Aug. 1, 2023, the content of which is incorporated by reference in its entirety.

TECHNICAL FIELD

The present disclosure generally relates to the field of display technologies and, more particularly, relates to a direct-lit backlight module, a method of designing a backlight module and a display device.

BACKGROUND

A direct-lit backlight module generally includes a substrate, optical film layers, a reflective member and a light-emitting element. The thickness of the air layer between the reflective member and the optical film layer is generally small or even no air layer. Although this structure helps to reduce the thickness of the backlight module to a certain extent, it is easy to cause the uneven brightness (Mura) in the display screen, requiring the addition of additional diffusion structures in the optical film layers, which will increase costs and the power consumption.

The present disclosed direct-lit backlight modules, methods of designing backlight modules and display devices are direct to solve one or more problems set forth above and other problems in the arts.

SUMMARY

One aspect of the present disclosure provides a direct-lit backlight module. The direct-lit backlight module includes a substrate; an optical film layer; a reflector; and a plurality of light-emitting elements. The substrate and the optical film layer are arranged oppositely; the plurality of light-emitting elements are arranged on a side of the substrate facing the optical film layer; the reflector is located between the substrate and the optical film layer and includes a plurality of reflective structures surrounding the plurality of light-emitting elements; there is a gap between the plurality of reflective structures and the optical film layer, and there is air in the gap. In the thickness direction of the direct-lit backlight module, a distance between one end of the reflective structure adjacent to the optical film layer and the optical film layer is OD1, and a distance between the substrate and the optical film layer is OD; and $$X = \frac{OD1}{OD}; \text{ and } 0.4 \leq X \leq 0.6.$$

Another aspect of the present disclosure provides a method of designing a backlight module. The method includes determining a structure of the direct-lit backlight module. The structure of the direct-lit backlight module includes a substrate, an optical film layer, a reflector and a plurality of light-emitting elements. The substrate and the optical film layer are arranged oppositely; the plurality of light-emitting elements are arranged on a side of the substrate facing the optical film layer; the reflector is located between the substrate and the optical film layer; the reflector includes a plurality of reflective structures, and the plurality of reflective structures surround the plurality of light-emitting elements; there is a gap between the reflective structure and the optical film layer, and there is air in the gap. The method also includes determining a distance P between two adjacent light-emitting elements of the plurality of light-emitting elements; and determining a distance OD between the substrate and the optical film layer according to the structure of the backlight module and the distance P between the two adjacent light-emitting elements; and determining a value range of OD1 according to $$0.4 \leq \frac{OD1}{OD} \leq 0.6.$$

In a thickness direction of the backlight module, OD1 is the distance between one end of the reflective structure adjacent to the optical film layer and the optical film layer.

Another aspect of the present disclosure provides a display device. The display device includes a direct-lit backlight module. The direct-lit backlight module includes a substrate; an optical film layer; a reflector; and a plurality of light-emitting elements. The substrate and the optical film layer are arranged oppositely; the plurality of light-emitting elements are arranged on a side of the substrate facing the optical film layer; the reflector is located between the substrate and the optical film layer and includes a plurality of reflective structures surrounding the plurality of light-emitting elements; there is a gap between the plurality of reflective structures and the optical film layer, and there is air in the gap. In the thickness direction of the direct-lit backlight module, a distance between one end of the reflective structure adjacent to the optical film layer and the optical film layer is OD1, and a distance between the substrate and the optical film layer is OD; and $$X = \frac{OD1}{OD}; \text{ and } 0.4 \leq X \leq 0.6.$$

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings can also be obtained from these drawings without creative effort.

DETAILED DESCRIPTION

Figure 1:
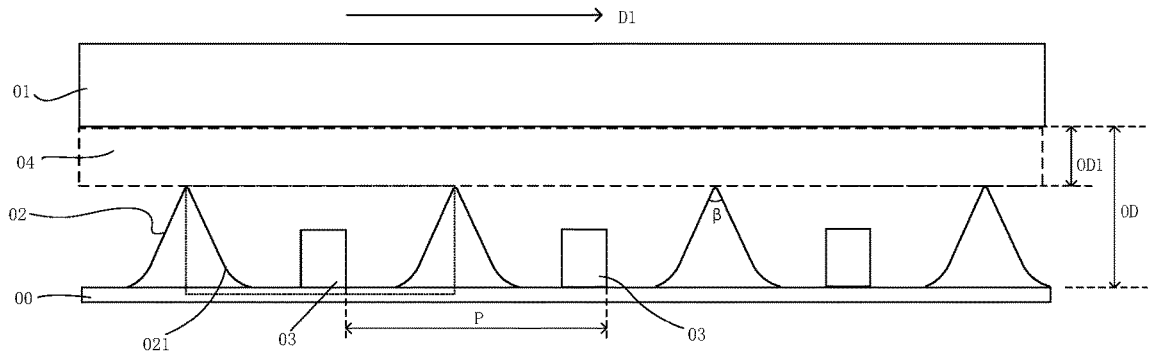
FIG. 1 illustrates an exemplary direct-lit backlight module according to various disclosed embodiments of the present disclosure.

Various exemplary embodiments of the present disclosure will now be described in detail with reference to the accompanying drawings. It should be noted that the relative arrangement of components and steps, numerical expressions and numerical values set forth in these examples do not limit the scope of the disclosure unless otherwise specifically stated.

The following description of at least one exemplary embodiment is merely illustrative in nature and is in no way intended to limit the disclosure, its application or uses.

Techniques, methods and devices known to those of ordinary skill in the relevant art may not be discussed in detail, but where appropriate, such techniques, methods and devices should be considered a part of the specification.

In all examples shown and discussed herein, any specific values are to be construed as illustrative only and not as limiting. Accordingly, other examples of the exemplary embodiments may have different values.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the corresponding claims (claimed technical solutions) and their equivalents. It should be noted that the implementation modes provided by the embodiments of the present disclosure can be combined with each other if there is no contradiction.

It should be noted that similar reference numerals and letters refer to similar items in the following figures, so that once an item is defined in one figure, it does not need further discussion in subsequent figures.

The disclosure provides a direct-light backlight module, a method of designing a backlight module and a display device. The direct-light backlight module may include a substrate, an optical film layer, a reflector, and a plurality of light-emitting elements. The substrate and the optical film layer may be arranged oppositely; the light-emitting elements may be arranged on a side of the substrate facing the optical film layer. The reflector may be located between the substrate and the optical film layer. The reflector may include multiple reflective structures, and the reflective structures may surround the light-emitting elements. There may be a gap between the reflective structure and the optical film layer, and there may be air in the gap. Along the thickness direction of the backlight module, the distance between the end of the reflective structure adjacent to the optical film layer and the optical film layer may be OD1, and the distance between the substrate and the optical film layer may be OD, the thickness ratio X of the air layer may be $$X = \frac{OD1}{OD}, \text{ and } 0.4 \leq X \leq 0.6.$$

By controlling the air layer thickness ratio X, the light in different partitions may be mixed to a certain extent, and the transitions between the pictures in different partitions may be uniform, and Mura may be avoided. Further, by controlling the air layer thickness ration X, Halo generated by a single partition may be controlled within a certain range. Accordingly, the picture quality may be improved.

The above is the core idea of the present disclosure. The technical solutions in the embodiments of the present disclosure will be clearly and completely described below with reference to the drawings in the embodiments of the present disclosure. Based on the embodiments of the present disclosure, all other embodiments obtained by those of ordinary skill in the art without any creative work may fall within the scope of protection of the embodiments of the present disclosure.

FIG. 1 illustrates a schematic structural diagram of an exemplary direct-lit backlight module provided by an embodiment of the present disclosure. As shown in FIG. 1, the direct-lit backlight module may include a substrate 00, an optical film layer 01, a reflector 02 and a plurality of light-emitting elements 03. The substrate 00 and the optical film layer 01 may be arranged oppositely. The light-emitting elements 03 may be arranged on the substrate 00 and may be located on the side of the substrate 00 facing the optical film layer 01. The reflector 02 may be located between the substrate 00 and the optical film layer 01. The reflector 02 may include a plurality of reflective structures 021. The reflective structures 021 may surround the light-emitting elements 03. There may be a gap 04 between the reflective structures 021 and the optical film layer 01, and there may be air in the gap 04. In the thickness direction of the backlight module, the distance between one end of the reflective structure 021 adjacent to the optical film layer 01 and the optical film layer 01 may be OD1, and the distance between the substrate 00 and the optical film layer 01 may be OD.

$$X = \frac{OD1}{OD}, \text{ and } 0.4 \le X \le 0.6.$$

Further, referring to FIG. 1, in the present disclosure, the distance between the end of the reflective structure 021 adjacent to the optical film layer 01 and the optical film layer 01 may refer to the end of the reflective structure 021 adjacent to the optical film layer 01 and the end of the optical film layer 01 facing the reflective structure 021. The distance between one side of the reflective structure 021 and the optical film layer 01 may be filled with air, the thickness of the air layer between the end of the reflective structure 021 adjacent to the optical film layer 01 and the optical film layer 01 may also be OD1. Thus, $$X = \frac{OD1}{OD}$$

may be expressed as the ratio between the thickness of the air layer OD1 between the end of the reflective structure 021 adjacent to the optical film layer 01 and the optical film layer 01 and the distance between the substrate 00 and the optical film 01. Hereinafter, X may be referred to as the air layer thickness ratio.

Figure 2:
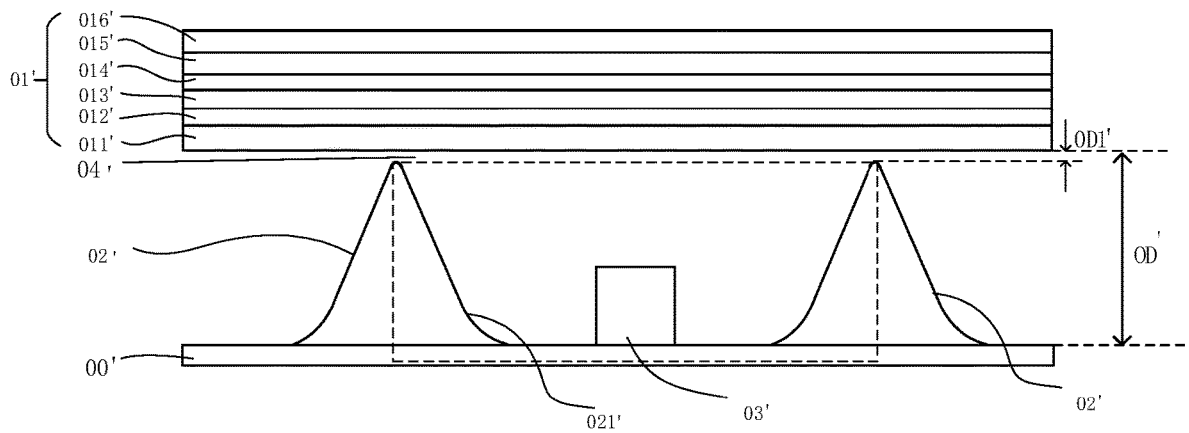
FIG. 2 illustrates a direct-lit backlight module.

FIG. 2 illustrates a schematic structural diagram of a direct-light backlight module. As shown in FIG. 2, in the related technology, the direct-lit backlight module includes a substrate 00', an optical film layer 01', and a reflector 02' and a plurality of light-emitting elements 03'. The substrate 00' and the optical film layer 01' are arranged oppositely. The light-emitting elements 03' are arranged on the substrate 00' and are located on the side of the substrate 00' facing the optical film layer 01'. The reflector 02 is located between the substrate 00' and the optical film layer 01'. The reflector 02' includes a plurality of reflective structures 021', and the reflective structures 021' surround the light-emitting elements 03'. The gap 04' between the reflective structures 021' and the optical film layer 01' is small or absent. When the distance between the substrate 00' and the optical film layer 01' is OD' and the value range is 3-7 mm, the thickness of the air layer at the gap 04' is OD1' and OD1' is less than 0.3 mm.

Generally speaking, the reflective structure is a kind of light reflective element. Due to the reflection effect, most of the light irradiated on the reflective structure is reflected back to the light partition where the reflective structure is located, that is, most of the light energy is concentrated in the specific light partition. As shown in FIG. 2, when the distance between the substrate 00' and the optical film layer 01' is constant, the higher the height of the reflective structure 021', the smaller the thickness of the air layer at the gap 04', and the higher the degree of the light is gathered in the reflective structure 021' in the light partition, and the higher the brightness of the single partition.

The thickness of the air layer at the gap 04' in the backlight module structure shown in FIG. 2 is OD1'; and OD1' is less than 0.3 mm. At this time, the light is gathered to a high degree in the light partition where the reflective structure 021' is located. In this way, the brightness of the single partition is very high. If the brightness is high, then there will be very little light spilling out of the reflective structure 021', the brightness transition between single partitions may not be smooth, and uneven light and dark will easily occur between single partitions and single partitions. In this regard, referring to FIG. 2, to reduce or eliminate the phenomenon of uneven light and dark among light in different partitions, in the structure shown in FIG. 2, the optical film layer 01' includes a multi-step diffusion structure. The multi-step diffusion structure may include diffusion a plate 011', a diffusion film 012', a first diffusion sub-film 013' and a second diffusion sub-film 014'. In this way, through the multi-step diffusion effects, the light is evenly distributed and the uneven light and dark between partitions are eliminated. However, the setting of the multi-step diffusion films will undoubtedly increase the cost and power consumption of the backlight module.

In view of this, comparing FIG. 1 with FIG. 2, one of the major differences between the backlight module provided by the embodiment of the present disclosure and the backlight module shown in the related art may include that, in one embodiment of the present disclosure, the thickness of the air layer between one end of the reflective structure 021 adjacent to the optical film layer 01 and the optical film layer 01 may be OD1, and the distance between the substrate 00 and the optical film layer 01 may be OD, $$X = \frac{OD1}{OD}, \text{ and } 0.4 \le X \le 0.6.$$

Generally speaking, the distance OD between the substrate 00 and the optical film layer 01 may not be too small. If it is too small, the light shadow may be relatively obvious. An increase in the OD value may help to eliminate the light shadow, but the OD value may not be too large. If it is too large, the overall thickness of the backlight module may be too thick, and the effect on improving the image quality may not be obvious. Therefore, the distance OD between the substrate 00 and the optical film layer 01 may be generally determined based on the principle of eliminating the light shadow. The structure shown in FIG. 2 also follows this principle. Therefore, under the same conditions, the value of OD' shown in FIG. 2 may not be much different from the value of OD of the module structure of the present disclosure.

Generally speaking, the value range of OD' and OD may be approximately 3-7 mm. For the structure shown in FIG. 2, OD1' is less than 0.3 mm; and for the structure shown in the embodiment of the present disclosure, the value of OD1 may be between approximately 1.2 mm and 4.2 mm. Taking the OD value as 5 mm as an example, OD1 may be 2.5 mm. Thus, the thickness of the air layer between the end of the reflective structure 021 adjacent to the optical film layer 01 and the optical film layer 01 may be significantly increased compared with the structure shown in FIG. 2.

Based on the previous description, because the value of OD' shown in FIG. 2 may be not much different from the value of OD of the module structure of the present disclosure, although the thickness of the air layer between one end of the reflective structure 021 adjacent to the optical film layer of 01 and the optical film layer 01 in the backlight module provided by the embodiment of the present disclosure may be increased significantly, but the overall thickness of the backlight module may not be increased significantly.

Therefore, on the basis of improving the image quality, it may meet the requirements for thinner backlight modules.

On the other hand, because the distance OD between the substrate 00 of the present disclosure and the optical film layer 01 may not be increased significantly, the relative increase in the thickness of the air layer between the end of the reflective structure 021 adjacent to the optical film layer 01 and the optical film layer 01 may be relatively large, compared with the height of the reflective structure 021' in FIG. 2, the height of the reflective structure 021 may be reduced.

Generally speaking, if there is no air layer or the air layer is relatively small, the light mixing effect at the top of the reflective structure may be poor, resulting in uneven light and dark (i.e., Mura). If the air layer is too large and the reflective structure is too low, the light may not be effectively controlled, and the crosstalk of light may be relatively serious, resulting in an obvious halo. Therefore, when designing the module structure, to improve the quality of the display screen, the thickness of the air layer may not be too thin or too thick, and the height of the reflective structure may not be too low or too high.

The present disclosure proposes the concept of the air layer thickness ratio X. The core idea may include increasing the air layer thickness ratio by adjusting the height of the reflective structure under the condition that the thickness of module meets the requirements. Thus, under the condition that the distance between the substrate 00 and the optical film 01 is a constant, by controlling the air layer thickness ratio X, the light in different partitions may be mixed to a certain extent, and the transitions of the pictures in different partitions may be more uniform, avoiding the generation of Mura. At the same time, by controlling the air layer thickness ratio X, the halo generated by a single partition may be controlled within a certain range. In this way, a better picture quality may be produced.

Through research, it is found that when X is less than 0.4, the mixing effect of light between single partitions may be not as desired, Halo may be small, but Mura may be more obvious. When Halo is too large, the clarity of the picture may be affected. Therefore, the present disclosure controls the air layer thickness ratio X in a range of approximately 0.4-0.6. Under a such condition, the Mura of the picture may be significantly reduced, or even eliminated; and Halo may be controlled within a certain range. In such a way, a better picture quality may be obtained.

In addition, the direct-lit backlight module of the present disclosure may control the air layer thickness ratio X by adjusting the height of the reflective structure when the distance between the substrate and the optical film layer is constant. Therefore, the thickness of the direct-lit backlight module of the present disclosure may not be greatly affected by OD1. For example, the direct-lit backlight module of the present disclosure may still have a desired thickness.

In summary, the direct-lit backlight module of the present disclosure may not only have a good picture quality, but also have a relatively small thickness.

It should be noted that in some embodiments of the present disclosure, a single partition may be the smallest area in which the backlight may be lit independently. In some cases, it may be an area surrounded by a reflective structure. There may be one light, four lights, or night lights, etc., in a single partition, which may be determined by the design.

Further, the dotted frame between the optical film layer 01 and the reflective structure 021 in FIG. 1 is intended to indicate the gap 04 between the reflective structure 021 and the optical film layer 01. The structure indicated by the other dotted frame is a reflective structure 021.

Figure 3:
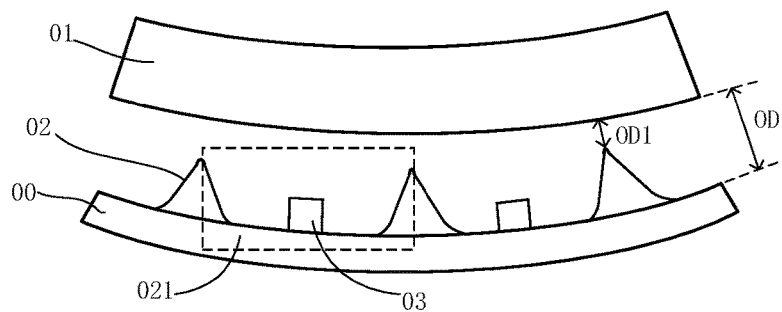
FIG. 3 illustrates an exemplary configuration of a substrate and optical films according to various disclosed embodiments of the present disclosure.

In addition, FIG. 1 only illustrates one implementation method of a direct-lit backlight module. Based on the idea of the present disclosure, the present disclosure also has other implementation methods. FIG. 3 illustrates another combination structure of a substrate and an optical film layer provided by one embodiment of the present disclosure. As shown in FIG. 3, in this structure, the substrate 00 and the optical film layer 01 may be both bent in a same direction, and the thickness of the air layer between one end of the reflective structure 021 adjacent to the optical film layer 01 and the optical film layer 01 may be OD1, the distance between the substrate 00 and the optical film layer 01 may be OD, and the relationship between OD1 and OD may still satisfy $$X = \frac{OD1}{OD}, \text{ and } 0.4 \leq X \leq 0.6$$

such that the transition between different single partitions may be relatively uniform to avoid the generation of Mura. At the same time, by controlling the air layer thickness ratio X, the halo generated by a single partition may be controlled within a certain range, which may facilitate producing a better picture quality.

The heights of each reflective structure shown in FIG. 1 may be consistent. In other embodiments of the present disclosure, the heights of reflective structures in different areas may be adjusted due to different design considerations. To reduce the difference in brightness between the light partitions in the peripheral area and the light partitions in the central area of the backlight module, the height of the reflective structure in the peripheral area may be adjusted to be greater than the height of the reflective structure in the central area. In this way, the difference between the brightness of the light partition in the peripheral area and the brightness of the light partition in the central area may be reduced. In this case, if the ratio between the thickness of the air layer between the one end of the reflective structure 021 adjacent to the optical film layer 01 and the optical film layer 01 and the distance between the substrate 00 and the optical film layer 01, i.e., the air layer thickness ratio, is still within the range of approximately 0.4-0.6, it is still within the protection scope of the present disclosure.

In summary, the idea of the present disclosure may include adjusting the image quality performance by controlling the air layer thickness ratio X. The backlight module in FIG. 1 is only one of the embodiments of the present disclosure, based on the practice application, the present disclosure also includes other approaches different from the structure illustrated in FIG. 1, and therefore, the structure shown in FIG. 1 does not limit the scope of the present disclosure.

Further, referring to FIG. 1, in some embodiments of the present disclosure, each reflective structure 021 may be arranged around a light-emitting element 03.

Specifically, referring to FIG. 1, one reflective structure 021 may be arranged around one light-emitting element 03. The light emitted by each light-emitting element 03 may be reflected by the corresponding reflective structure 021. Therefore, each light-emitting element 03 may form a relatively independent light-emitting area. In this way, the crosstalk between the light emitted by different light-emitting elements 03 may be reduced, which may be beneficial to improving the picture quality.

Further, referring to FIG. 1, in some embodiments of the present disclosure, the light-emitting element 03 may be an independently controlled light-emitting element. $0.15 \leq Y < 0.25$, and $$Y = \frac{L1}{L2}.$$

L1 is the brightness measured by lighting a single light-emitting element, and L2 is the vertical brightness of the center measured by lighting all the light-emitting elements.

Specifically, as mentioned above, a reflective structure 021 may be arranged around a light-emitting element 03, and the light emitted by each light-emitting element 03 may be reflected by the corresponding reflective structure 021. Therefore, each light-emitting element 03 may form a relatively independent light-emitting area. In this way, the series-parallel mode of the light-emitting element control circuit may be selected according to different needs, thereby realizing the required number of independent control units. In some embodiments of the present disclosure, each light-emitting element 03 may be an independently controlled unit. In this way, the number of single partitions in the backlight module may be larger, the contrast control of the partitions may be adjusted more carefully, and the displayed image quality may be better. Therefore, the present disclosure adopts a structure of one light-emitting element in one partition, the brightness and darkness of each light-emitting element may be adjusted. In this way, the picture may be more delicate.

Furthermore, due to the large number of partitions, there may be a certain difference in brightness between single partitions. Regarding this phenomenon, the phenomenon of uneven light and dark between partitions may be not only related to the brightness ratio of each partition Y, it may be also related to the air layer thickness ratio X.

It should be noted that, $$Y = \frac{L1}{L2},$$

L1 is the brightness measured when a single light-emitting element 03 is lit, that is, the single-partition brightness, and L2 is the vertical brightness measured at the center when all the light-emitting elements 03 are lit, that is, the full white brightness.

It is found that the phenomenon of uneven light and dark between partitions may not depend on the absolute brightness of a single partition, but on the brightness ratio Y of a single partition; and it may not depend on the thickness of the air layer, but on the thickness of the air layer ratio X.

The phenomenon of uneven light and dark in the picture may be solved by adjusting the air layer thickness ratio X. However, the air layer thickness ratio X may also affect the brightness of a single partition. Generally speaking, the larger the X, the smaller the ratio Y between the brightness in a single partition and the full white brightness. When Y is too small, it may affect the clarity of the picture. However, when Y is too large, the uneven light and dark may appear between the pictures.

Table 1 shows different X values and corresponding Y values, and the curve fitting formula. Table 2 shows each X value in Table 1 and the Mura level represented by the picture for each corresponding Y value. Table 3 is an interpretation of the Mura level in Table 2.

TABLE 1

| | | | | | Y | | | | |
|---|---|---|---|---|---|---|---|---|---|
| x | 0.70 | 0.60 | 0.48 | 0.40 | 0.35 | 0.28 | 0.22 | 0.15 | Formula |
| Upper limit | 0.123 | 0.161 | 0.217 | 0.257 | 0.291 | 0.345 | 0.411 | 0.501 | y = −0.248ln(x) + 0.033 |
| Median | 0.117 | 0.153 | 0.207 | 0.246 | 0.277 | 0.329 | 0.391 | 0.477 | y = −0.236ln(x) + 0.0314 |
| Bottom limit | 0.111 | 0.145 | 0.196 | 0.233 | 0.264 | 0.312 | 0.372 | 0.453 | y = −0.224ln(x) + 0.0297 |

TABLE 2

| | | | | | x | | | | |
|---|---|---|---|---|---|---|---|---|---|
| | y | 0.7 | 0.6 | 0.48 | 0.40 | 0.35 | 0.28 | 0.22 | 0.15 |
| Mura level | Upper limit | L0 | L0 | L0 | L1 | L2 | L3 | L3 | L4 |
| | Median | L0 | L0 | L0 | L1 | L2 | L3 | L3 | L4 |
| | Bottom limit | L0 | L0 | L0 | L1 | L2 | L3 | L3 | L4 |

TABLE 3

| Description | | | |
|---|---|---|---|
| | L0 | No space shadow Mura | Acceptable Mura |
| | L1 | Extremely minor Mura | |
| | L2 | Obvious Mura | Acceptable if the image requirement is not strict, and need to improve if the requirement is strict |
| | L3 | Significantly obvious Mura | Mura is unacceptable |
| | L4 | Severe Mura | Mura is unacceptable |

Combining Table 1, Table 2 and Table 3, it may be seen from Table 1 that when $0.4 \leq X < 0.6$ and 0.15 Y<0.25, the Mura level of the displayed screen may be L0 or L1. When X is less than 04 and Y is greater than 2.5, the Mura level of the displayed screen is L2, L3 or L4 and with obvious Mura or severe Mura, and most of them may be unacceptable.

Further, combining Table 1, Table 2 and Table 3, when X is greater than 0.6 and Y is less than 1.5, the Mura level is L0, and the Mura level may be acceptable. However, the present disclosure may not only consider the Mura, but also the Halo. When X is greater than 0.6 and Y is smaller than 1.5, the brightness of the picture may be too low, Halo may be more obvious, and the clarity of the picture may be seriously affected.

It is found that when $0.4 \leq X < 0.6$ and 0.15 Y<0.25, the backlight module with the structure of one partition with one light-emitting element may have a better picture quality. Therefore, through the control of X and the control of Y, the present disclosure may aim to eliminate Mura while maintaining a certain Halo to solve the problem of uneven picture transition or grid pattern. At the same time, it may also take into account the clarity requirements of the picture.

It should be noted that Table 1 only shows the different air layer thickness ratios and the corresponding Y values when the OD value is 4.6 mm. Table 1 is only for one exemplary embodiment and not for the limitation of the present disclosure. Through the testing and simulation, the applicable range of the OD value of the present disclosure may be approximately 3 mm-7 mm. Therefore, the data shown in Table 1 cannot be used as a limitation of the present disclosure. Based on the core idea of the present disclosure, under different OD values, the values of X and the values of Y may be different from the data given in Table 1.

In some embodiments of the present disclosure, Y=a×ln(X)+b. −0.248≤a≤0.224; and 0.0297≤b≤0.033.

Specifically, there may be a relationship between Y and X. By controlling the range of X and the range of Y, the overall quality of the display images may be as desired. Through a large number of experiments, the relationship between the brightness ratio Y of a single partition and the air layer thickness ratio X may be summarized. When the air layer thickness ratio X and the brightness ratio of a single partition have a certain function, i.e., Y=a×ln(X)+b, and −0.248≤a≤−0.224; and 0.0297≤b≤0.033, the overall quality of the picture may be improved.

Figure 4:
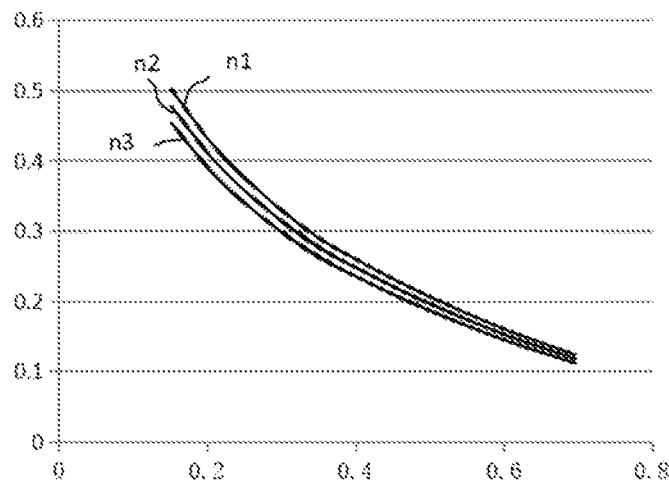
FIG. 4 illustrates an exemplary fitting curve between different thickness ratios of air layer X and the corresponding Y values according to various disclosed embodiments of the present disclosure.

FIG. 4 is a fitting curve diagram of different air layer thickness ratios X and corresponding Y values provided by the embodiment of the present disclosure. The n1 curve is a fitting curve diagram of different air layer thickness ratios and corresponding upper limit values of Y. The n2 curve is a fitting curve diagram of different air layer thickness ratios X and the corresponding median values of Y. The n3 curve is a fitting curve diagram of different air layer thickness ratios X and the corresponding low limit values of Y. The ordinate is the brightness ratio Y between the single partition and the full white area.

Combining Table 1, Table 2, and Table 3, and as shown in FIG. 3 and FIG. 4, through the curve fitting, different air layer thickness ratios X and the corresponding upper limit values of Y may have the relationship of y=−0.248ln(x)+0.033; different air layer thickness ratios and the corresponding median values of Y may have the relationship of y=−0.236ln(x)+0.0314; and different air layer thickness ratios and the corresponding lower limit values of Y may have the relationship of y=−0.224ln(x)+0.0297.

By providing the functional relationship between the brightness ratio Y and the air layer thickness ratio X of a single partition, the present disclosure may better guide the module structure design to design a high-quality module structure faster and better and may have the significant contribution in the process from setting product characteristic requirements to arriving at product design solutions.

In some other embodiments of the present disclosure, y=−0.236ln(x)+0.0314.

Specifically, the height of the reflective structure 021 may generally have a tolerance of ±0.2 mm. In the functional relationship Y=a×ln(X)+b, the values of a and b may have a range, −0.248≤a≤−0.224; and 0.0297≤b≤0.033. Specifically, when the tolerance is +0.2 mm, it may correspond to a=−0.248, and b=0.033. When the tolerance is −0.2 mm, it may correspond to a=−0.224, and b=0.0297. When there is no deviation, it may correspond to a=−0.236, and b=0.0314. Therefore, when the height tolerance of the reflective structure 021 is 0, the backlight module designed according to y=−0.236ln(x)+0.0314 may have a good picture quality.

Figure 5:
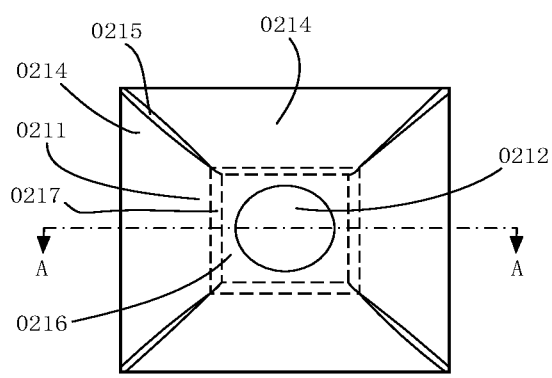
FIG. 5 illustrates an exemplary reflective structure according to various disclosed embodiments of the present disclosure.
Figure 6:
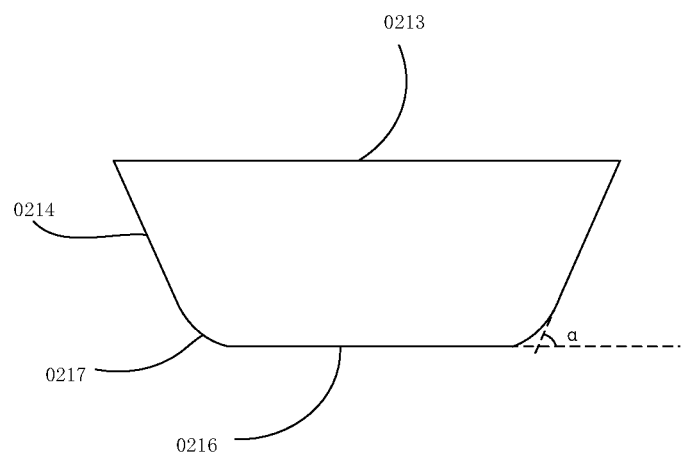
FIG. 6 illustrates another exemplary reflective structure according to various disclosed embodiments of the present disclosure.
Figure 7:
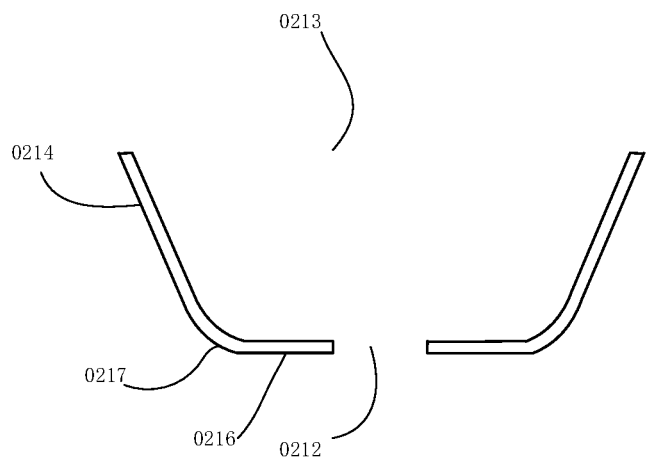
FIG. 7 illustrates an A-A'-sectional view in FIG. 6.

FIG. 5 is a schematic top view of a reflective structure provided by an embodiment of the present disclosure. FIG. 6 is a schematic side view of a reflective structure provided by an embodiment of the present disclosure. FIG. 7 shows a schematic A-A-sectional structural view in FIG. 5. As shown in FIGS. 5-7, in some embodiments of the present disclosure, the reflective structure 021 may include a reflective cavity 0211. The reflective cavity 021 may include a pocket hole 0212 at one end facing the substrate 00. The pocket hole 0212 of the reflective cavity 0211 may be configured to make the reflective structure avoid the light-emitting element 03. The light-emitting element 03 may pass through the pocket hole 0212 of the reflective structure 021. The other end of the reflective cavity 0211 may include a light outlet 0213. The cross-sectional area of the reflective cavity 0211 may gradually extend from the pocket hole 0212 to the light outlet 0213. The light-emitting element 03 may pass through the corresponding pocket hole 0212 and may be installed on the substrate 00. The light-exiting surface of the light-emitting element 03 may face the light outlet 0213. In the direction parallel to the plane of the substrate 00, two adjacent reflective structures 021 may be connected at one end of the light outlet 0213.

Figure 8:
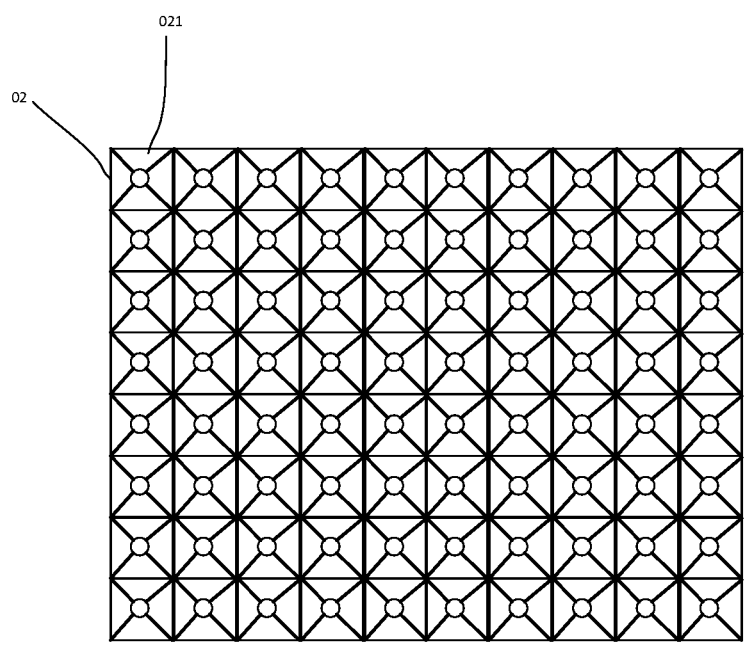
FIG. 8 illustrates an exemplary reflective member according to various disclosed embodiments of the present disclosure.

Further, combining FIG. 1, FIG. 5, FIG. 6 and FIG. 7, as mentioned above, the reflective structure 021 may be a light reflective element. Due to the reflection effect, most of the light irradiated on the cavity wall of the reflective cavity 0211 may be reflected back to the partition. That is, most of the light energy may be concentrated within a single partition, and a small portion of the light may be emitted outside the single partition. To eliminate the uneven light and dark phenomenon between the single partitions, the present disclosure desires that a portion of the light may be emitted outside the single partition, and the light from adjacent single partitions and located outside the single partition may mix with each other. In this way, it may help to eliminate the uneven light and dark phenomenon between the single partitions and improve the quality of the picture. Based on this consideration, in the reflective structure 021 in the backlight module the present disclosure, the cross-sectional area of the reflective cavity 0211 may be gradually expanded from the pocket hole 0212 to the light outlet 0213. In this way, it may help a part of the light to be emitted outside the single partition, which may provide favorable conditions for the mixing of light between single partitions. On this basis, although the favorable conditions of the mixing of light between single partitions may be provided, most of the light energy may still be concentrated in a single partition, and the overflowing light may be still in the minority. Therefore, if there is a gap between single partitions, then a dark area may be easily formed in the gap. For this reason, as shown in FIG. 8, which is a structural diagram of a reflective member provided by an embodiment of the present disclosure, along the direction parallel to the plane of the substrate 00, the reflector 02 may include a plurality of reflective structures 021. Two adjacent reflective structures 021 may be connected at one end of the light outlet 0213. In this way, the reflective structures 021 may be seamlessly spliced to enhance the quality of the picture.

Figure 9:
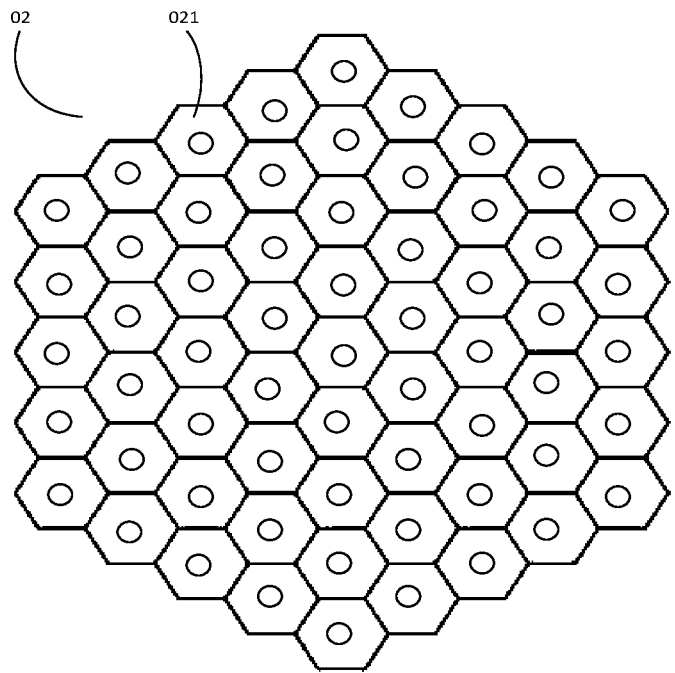
FIG. 9 illustrates an exemplary reflective member according to various disclosed embodiments of the present disclosure.

FIG. 9 is a schematic structural diagram of a reflector provided by an embodiment of the present disclosure. As shown in FIG. 9, in some embodiments of the present disclosure, the shape of one end of the reflective structure 021 with the light outlet 0213 may be a regular hexagon.

Specifically, referring to FIG. 9, in some embodiments of the present disclosure, the shape of one end of the reflective structure 021 disposed with the light outlet 0213 may be a regular hexagon. Specifically, the reflective structure 021 may include six sidewalls disposed around the pocket hole 0212, and the angle between two adjacent sidewalls among the six sidewalls may be approximately 120°.

Generally speaking, referring to FIGS. 5-7, in some embodiments of the present disclosure, the shape of one end of the reflective structure 021 where the light outlet 0213 is provided may generally be a square, including four sidewalls 0214 provided around the pocket hole 0212. The angle between two adjacent sidewalls among the four sidewalls 0214 may be approximately 90°.

Comparing the reflective structure shown in FIG. 9 with the reflective structure shown in FIG. 5, in the reflective structure 021 in the reflector 02 shown in FIG. 9, the angle between two adjacent sidewalls may be approximately 120°, while in the reflective structure 021 shown in FIG. 5, the angle between two adjacent sidewalls may be approximately 90°. The larger the angle between the sidewalls, the smoother the transition of light between the two adjacent sidewalls, and the reflective structure 021 may process the light more uniformly. Therefore, the reflective structure 021 provided in FIG. 8 may be provided with the shape of one end of the light outlet 0213 being a regular hexagon. The reflective structure 021 may process the light more uniformly, which may help to improve the uniformity of the display and improve the display quality.

Referring to FIG. 1, FIG. 5, FIG. 6 and FIG. 7, in some embodiments of the present disclosure, the reflective structure 021 may include a plurality of sidewalls 0214 surrounding the light-emitting elements 03. Along the surrounding direction, there may be a first arc connection member 0215 between two adjacent sidewalls 0214.

Specifically, referring to FIG. 1 and FIGS. 5-9, as mentioned above, whether the reflective structure 021 includes four sidewalls, six sidewalls or other numbers of sidewalls, there may always be an angle between adjacent sidewalls. In this way, for the light processing, it may be easy to produce uneven phenomena at the angle, and there may be a jump in the light processing at the angle. Therefore, the present disclosure may provide a first arc connection member 0215 between two adjacent sidewalls 0214. Through the first arc connection member 0215, the transition between the two adjacent sidewalls 0214 may be smoother and the interference of light may be avoided. When the reflective surface suddenly changes, a more obvious light and dark area may be formed. Therefore, the difference in light processing between two adjacent sidewalls 0214 may be reduced, which may help improve the uniformity of the display and improve the display quality.

Further, referring to FIG. 1, and FIGS. 5-7, the reflective structure 021 may also include a bottom 0216. The bottom 0216 may be fixedly connected to the substrate 00, and the bottom 0216 may be provided with a pocket hole 0212.

Specifically, referring to FIG. 1, and FIGS. 5-7, the reflective structure 021 may also include a bottom 0216. The bottom 0216 and the substrate 00 may be fixedly connected through double-sided tape. The bottom 0216 may be provided with a pocket hole 0212. The reflective structure 021 may include the bottom 0216, which may also have a reflective effect on light, and may be beneficial to improving light efficiency.

Further, referring to FIGS. 5-7, a second arc connection member 0217 may be provided between the bottom 0216 and the sidewall 0214.

Specifically, referring to FIG. 1, FIGS. 5-7, the bottom 0216 may be fixedly connected to the substrate 00, and the sidewalls 0214 may be arranged around the light-emitting element 03. Therefore, there may be an angle between the bottom 0216 and the sidewall 0214. In such a configuration, for the processing of light, the uneven phenomena may be prone to occur at the included angles, and jump in light processing may occur at the included angles. Based on this, the present disclosure may be provided with a second arc connection member 0217 between the bottom 0216 and the sidewall 0214 to make the transition between the bottom 0216 and the sidewall 0214 smoother through the second arc connection member 0217, preventing the light from forming a more obvious light and dark area when it encounters a sudden change in the reflective surface. Therefore, the difference in light processing at the connection location between the sidewall 0214 and the bottom 0216 may be reduced, which may help improve the uniformity of the display and improve the display quality.

It should be supplemented that FIGS. 5-7 illustrate the first arc connection member 0215 and the second arc connection member 0217 of the present disclosure using the reflection structure of four sidewalls as an example. However, the structure shown in FIGS. 5-6 does not limit other specific embodiments of the present disclosure. For example, the reflective structure 021 may also include six sidewalls. The angle between adjacent two sidewalls of the reflective structure may also be changed according to actual needs; and the sidewall may be a plane or a curved surface, etc.

Further, referring to FIG. 1, in some optional implementations of the present disclosure, the distance between two adjacent light-emitting elements 03 may be P, and $$1.95 \le \frac{P}{OD} \le 2.05.$$

Referring to FIG. 1, it should be noted that in the first direction D1, the distance between two adjacent light-emitting elements 03 in the present disclosure may be the distance between one side of one light-emitting element 03 and the other side of the adjacent other light-emitting element 03. The first direction D1 may be parallel to the plane where the substrate 00 is located.

When designing the structure of the backlight module, it may be first necessary to determine the backlight module architecture, secondly determine the number of single partitions, and determine the distance P between the two light-emitting elements 03, and then determine the distance OD between the substrate 00 and the optical film layer 01 according to the architecture of the blacklight module and the distance P between the two light-emitting elements 03.

In practice, it has been found that when the ratio of P to OD is less than 1.95, two situations may occur. One is that P may be smaller, then the number of light-emitting elements 03 arranged per unit area on the substrate 00 may be larger, and the cost may be relatively high. The other is that the OD may be larger, which may make the thickness of the backlight module larger. When the ratio of P to OD is greater than 2.05, two situations may also occur. One is that P is larger, then at this time, the number of light-emitting elements 03 arranged per unit area on the substrate 00 may be smaller, which may cause the backlight brightness to be insufficient. The other may be that the OD is small, at this time, there may be a risk of light shadows and the image quality may be deteriorated. When P and OD are satisfied, the light shadow may be better covered, the picture quality may be improved, and the appropriate product thickness and backlight brightness may be maintained.

In FIG. 1, the angle between the sidewalls of two adjacent reflective structures 021 may be 3, and 30°≤β≤80°.

Referring to FIGS. 5-6, the angle between the surface of the sidewall 0214 facing the light-emitting element 03 and the plane of the substrate 00 may be a, and 55°≤a≤75°; or the angle between the tangent line of the surface of the sidewall 0214 facing the light-emitting element 03 and the plane where the substrate 00 is located may be a, and 55°≤a≤75°.

Specifically, referring to FIGS. 5-7, in some embodiments, the surface of the side wall 0214 facing the light-emitting element 03 may be flat. In such a way, the angle between the surface of the sidewall 0214 facing the light-emitting element 03 and the plane where 00 is located may be a, and 55°≤a≤75°. In other embodiments of the present disclosure, the surface of the sidewall 0214 facing the light-emitting element 03 may be a curved surface. In such a way, the angle between the tangent line of the surface of the sidewall 0214 facing the light-emitting element 03 and the plane of the substrate 00 may be a, and 55°≤a≤75°.

It should be noted here that in the structural design of the direct-lit backlight module, the reflective structure 021 may be selected after the parameters OD and P are determined; the opening size of the light outlet 0213 of the reflective structure 021 may depend on P. In one case, for example, when the shape of the light outlet 0213 of the reflective structure 021 is in the positive direction, the width of the square may be equal to P.

Figure 10:
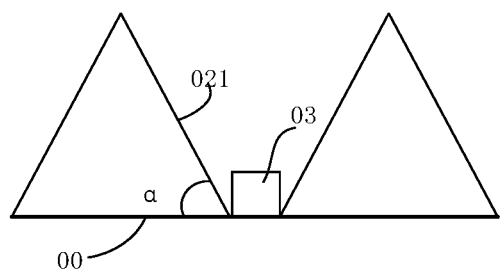
FIG. 10 illustrates an exemplary installation relationship between the reflective structure and the light-emitting element according to various disclosed embodiments of the present disclosure.
Figure 11:
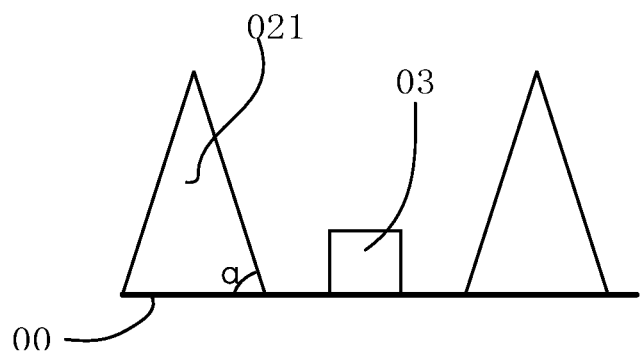
FIG. 11 illustrates another exemplary installation relationship between the reflective structure and the light-emitting element according to various disclosed embodiments of the present disclosure.
Figure 12:
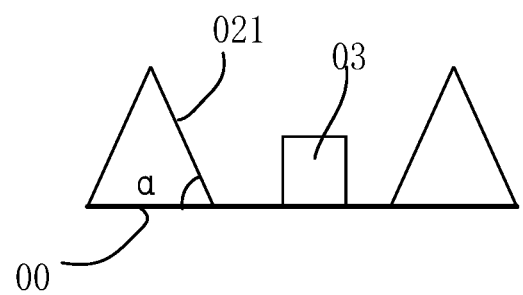
FIG. 12 illustrates another exemplary installation relationship between the reflective structure and the light-emitting element according to various disclosed embodiments of the present disclosure.

FIG. 10 is an exemplary schematic diagram of the installation relationship between the reflective structure and the light-emitting element provided by the embodiment of the present disclosure. FIG. 11 is another exemplary schematic diagram of installation relationship of the reflective structure and the light-emitting element provided by the embodiment of the present disclosure. FIG. 12 is another exemplary schematic diagram of the installation relationship between the reflective structure and the light-emitting element provided by the embodiment of the present disclosure.

As shown in FIGS. 10-12, when P is determined, the opening size of the light outlet 0213 of the reflective structure 021 may also be determined. Because the sidewalls 0214 of the reflective structure 021 may be arranged around the light-emitting element 03, the bottom 0216 of the reflective structure 021 may also need to surround the light-emitting element 03. In this way, when the height of the reflective structure 021 is high, the angle α between the sidewall 0214 of the reflective structure 021 facing the surface of the light-emitting element 03 and the plane of the substrate 00 may also be slightly larger, such as 70±5°. In this way, the bottom 0216 of the reflective structure 021 may be kept away from the location of the light-emitting element 03. Similarly, when the height of the reflective structure 021 is small, the angle α between the surface of the sidewalls 0214 of the reflective structure 021 facing the light-emitting element 03 and the plane of the substrate 00 may be slightly smaller, such as 60° or 55°. In this way, the reflective surface of the reflective structure 021 may be smoother.

In addition, it should be noted that the inclination angle of the reflective structure 021 may be affected by P, the height of the reflective structure, and the setting position of the light-emitting element 03; and such three factors may be the main influencing factors. On this basis, the influence of the setting of the inclination angle on the light mixing may be considered. For example, when the height of the reflective structure 021 is small, the angle α between the sidewall of the reflective structure 021 facing the surface of the light-emitting element 03 and the plane where the substrate 00 is located may be slightly smaller, such as 60°, or 55°. However, if mixing light is taken into consideration, it may not mean that the smaller the included angle α is not, the better. If it is too small, it may cause optical crosstalk. Therefore, the inclination of the reflective structure 021 may also need to consider the effect of mixing light while meeting the major premise.

Figure 13:
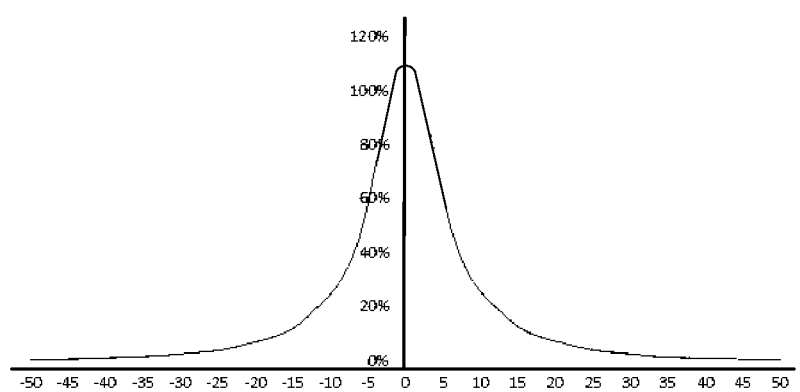
FIG. 13 illustrates a light type of a single section according to various disclosed embodiments of the present disclosure.

FIG. 13 is a light type diagram of an exemplary single partition provided by an embodiment of the present disclosure. As shown in FIG. 13, in some optional implementations of the present disclosure, the light type of a single partition where the light-emitting element 03 is located may be a Gaussian-type light.

Referring to FIG. 1 and FIG. 13, in some embodiments of the present disclosure, the light type of a single partition where the light-emitting element 03 is located may be a Gaussian-type light.

Specifically, FIG. 13 shows the horizontal brightness distribution of the light-emitting surface when the height of the light-emitting surface is constant. The abscissa represents the distance from the light-emitting center in millimeters, and the ordinate represents the relative brightness distribution. When the horizontal brightness distribution is a Gaussian-type, the brightness transition of the screen display may be relatively gentle, which may help to improve the display quality.

In practical applications, the display quality of the picture may be adjusted by adjusting the half-height width. If the half-height width is too wide, the halo may be obvious. If the half-height width is too narrow, the halo may be too small and the picture transition may not be smooth enough. The half-height width may refer to the width when the brightness is attenuated by half. The adjustment of the half-height width may be achieved by adjusting the height of the reflective structure 021.

Figure 14:
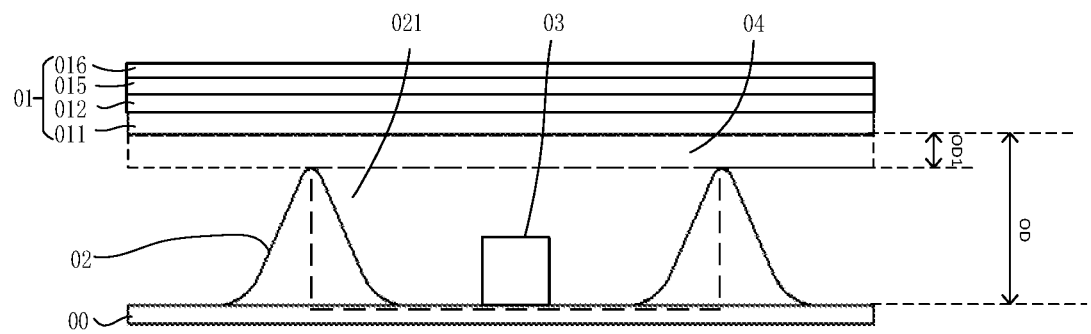
FIG. 14 illustrates another exemplary direct-lit backlight module according to various disclosed embodiments of the present disclosure.

FIG. 14 shows a schematic structural diagram of another exemplary direct-lit backlight module provided by an embodiment of the present disclosure. As shown in FIG. 14, in some embodiments of the present disclosure, the optical film layer 01 may include a diffusion plate 011. The diffusion plate 011 may be arranged opposite to the substrate 00, and OD may be the distance between the diffusion plate 011 and the substrate 00.

Specifically, referring to FIG. 14, in some embodiments of the present disclosure, the optical film layer 01 may include a diffusion plate 011. The diffusion plate 011 may be arranged opposite to the substrate 00, and OD may be the distance between the diffusion plate 011 and the substrate 00. For example, in the thickness direction of the display module, the diffusion plate 011 may be the film layer closest to the substrate 00 among the optical film layers 01. In the present disclosure, the distance between the reflective structure 021 and the optical film layer 01 may refer to the distance between the top of the reflective structure 021 adjacent to the diffusion plate 011 and the bottom surface of the diffusion plate 011. In addition to the diffusion plate 011, the optical film layer 01 may also include other film layers, such as diffusion films, light-enhancing films, etc. In the present embodiment, the diffusion plate 011 may be arranged on the bottom layer of the optical film layer 01 for two reasons. On the one hand, the diffusion plate 011 may atomize the light, thus playing a role in unforming the light, making the distribution of light intensity more uniform, thereby further eliminating the phenomenon of light and dark. On the other hand, the diffusion plate 011 may have a supporting role, and disposing the diffusion plate 011 at the bottom layer of the optical film layer 01 may better support other film layers.

Further, referring to FIG. 14, in some optional embodiments of the present disclosure, the optical film layer 01 may also include a diffusion sheet 012, a light-enhancing film 015 and a light-enhancing-like film 016. The diffusion sheet 012 may be located between the diffusion plate 011 and the light-enhancing film 015. The light-enhancing film 015 may be located between the diffusion sheet 011 and the light-enhancing-like film 016.

Specifically, both the diffusion plate 011 and the diffusion sheet 012 may have the function of uniformizing light, both of which may be intended to fully scatter the light and achieve a softer and uniform illumination effect. The difference may include that the diffusion plate 011 may have a higher hardness such that it may play a supporting role; and the diffusion sheet 012 may generally have a good flexibility. The main function of the light-enhancing film 015 and the light-enhancing film 016 may be to gather the dispersed light toward the front direction to increase the brightness.

Comparing the structure shown in FIG. 14 with the structure shown in FIG. 2, in some optional embodiments of the present disclosure, the optical film layer 01 of the direct backlight module may only include a diffusion plate 011, a diffusion sheet 012, and a light-enhancing film 015 and a light-enhancing-like film 016. In such a way, a better picture quality may be achieved, for example, no uneven light and dark, and with moderate brightness. On the contrary, in the direct-lit backlight module structure shown in FIG. 2, the thickness of the air layer between the optical film layer 01' and the reflective structure 021' is relatively small, generally less than 0.3 mm. In this way, there is very little light at the highest peak position of the reflective structure 021, and the light mixing effect between adjacent single partitions will become worse, resulting in dark shadows between adjacent single partitions, and the picture quality will be poor. Based on this, to eliminate dark shadows between adjacent single partitions of the structure shown in FIG. 2, the optical film layer 01' includes a diffusion plate 011', a diffusion sheet 012', a first diffusion film 013', a second diffusion film 014', and a light-enhancing film 015' and a light-enhancing-like film 016', among which the diffusion plate 011', diffusion sheet 0112', the first diffusion film 013', and the second diffusion film 014' have the same functions as the diffusion plate 01' and the diffusion sheet 0112' involved in the embodiment of the present disclosure. The difference may include that the structure shown in FIG. 2 uses more diffusion structures. Its purpose is to use more uniform light to eliminate dark and shadows between adjacent single partitions and improve the quality of the picture.

In summary, the present disclosure may ensure a sufficient light mixing distance between the substrate 00 and the optical film layer 01 by increasing the air layer thickness ratio. Such an approach may facilitate eliminating the shadow between the single partitions. Accordingly, the structure of the optical film 01 may be simpler, and the number of diffusion-type film layers may be reduced. Generally speaking, every time light passes through a layer of optical film, its energy may be consumed. Therefore, the present disclosure may increase the air layer thickness ratio X such that there may be a sufficient light mixing distance between the substrate 00 and the optical film layer 01, which may reduce the use of diffusion film layers. Therefore, it may reduce power consumption and costs.

Further, referring to FIG. 14, in some embodiments of the present disclosure, the material of the diffusion plate 011 may be PC, PS or PMMA; and the thickness of the diffusion plate 011 may be in a range of approximately 1.5 mm-2 mm.

Specifically, in some embodiments of the present disclosure, the material of the diffusion plate 011 may include PC, PS, or PMMA, etc., and the thickness of the diffusion plate 011 may be in a range of approximately 1.5 mm-2 mm. In such a configuration, the diffusion plate 011 may have a certain hardness and supporting force.

Figure 15:
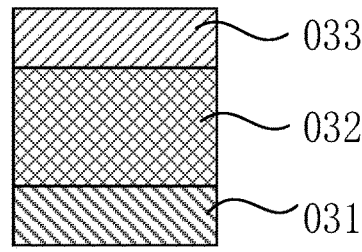
FIG. 15 illustrates an exemplary light-emitting element according to various disclosed embodiments of the present disclosure.

FIG. 15 is a schematic structural diagram of an exemplary light-emitting element provided by an embodiment of the present disclosure. As shown in FIG. 15, the light-emitting element 03 may include an electrical connection layer 031, a light-emitting layer 032 and a diffusion layer 033. The electrical connection layer 031 may be in contact with the substrate 00 and electrically connected with the substrate 00. The light-emitting layer 032 may be located on the side of the electrical connection layer 031 away from the substrate 00. The diffusion layer 033 may be provided on the side of the light-emitting layer 032 away from the substrate 00. In one embodiment, the light-emitting element 03 may be a light-emitting diode. Specifically, the light-emitting diode may be a mini light-emitting diode or a micro light-emitting diode, etc.

Specifically, referring to FIG. 1 and FIG. 15, the substrate 00 may carry the light-emitting element 03. The substrate 00 may be a PCB board. The substrate 00 may also be a thin-film transistor array substrate with a control circuit for the light-emitting element 03. The corresponding position of the substrate 00 may be set with output electrodes of the control circuit; and the electrical connection layer 031 of the light-emitting element 03 may be provided with corresponding input electrodes (positive and negative electrodes) and may be electrically connected to the output electrodes of the substrate 00. Accordingly, the electrical connection layer 031 may be electrically connected to the substrate 00 for the light emission control of the light emitting element 032. The diffusion layer 032 may be configured to adjust the light intensity distribution to make the light-emitting angle larger and the light-emitting more uniform. Generally speaking, the larger the light emitting angle of the light-emitting element 03, the more obvious the effect of the reflective structure 021, and the better the uniformity of the light emission. Therefore, in some embodiments of the present disclosure, the light-emitting angle of the light-emitting element 03 may be approximately 1800, or 160°, etc., and it may not be necessary for the light-emitting angle to be greater than 180°.

Figure 16:
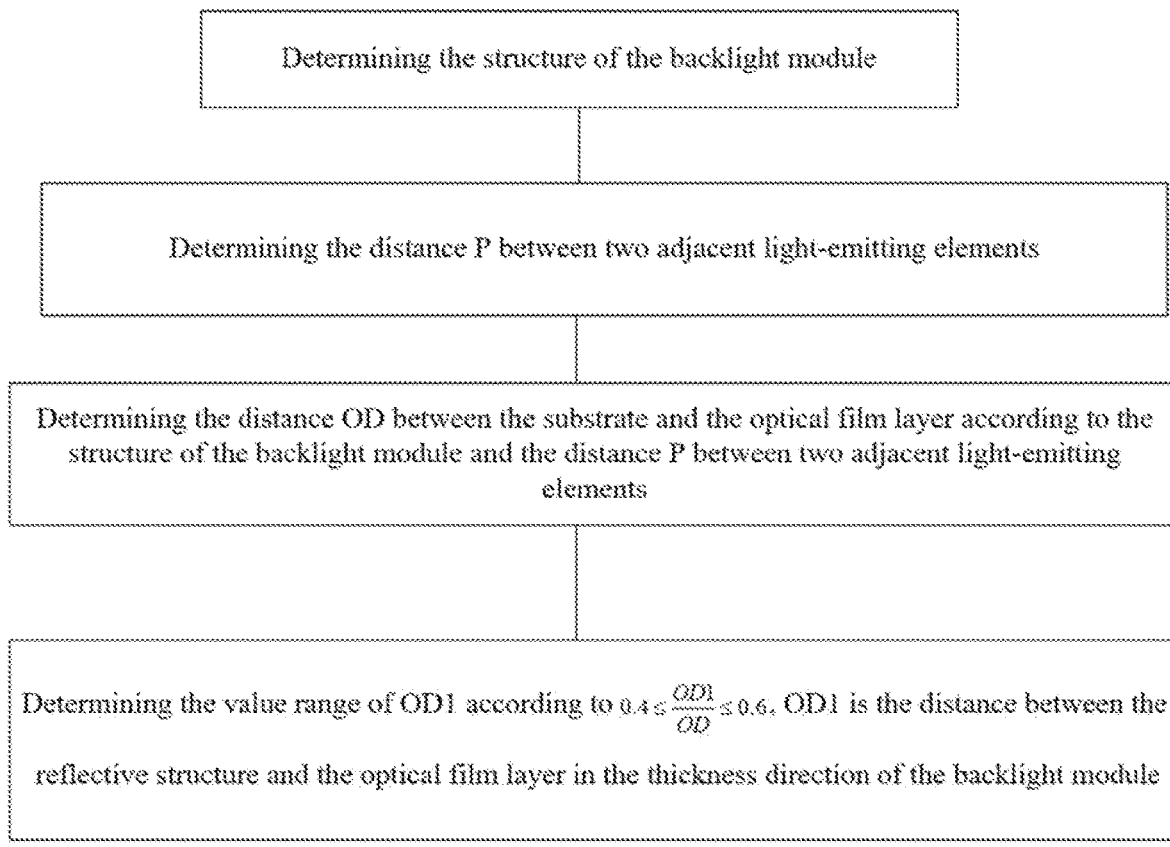
FIG. 16 illustrates an exemplary method of designing a direct-light backlight module according to various disclosed embodiments of the present disclosure.

The present disclosure also provided a method of designing a direct-lit backlight module. FIG. 16 is a schematic diagram of an exemplary design method for a direct-lit backlight module provided by an embodiment of the present disclosure. As shown in FIG. 16, and referring to FIG. 1, the method may include:

S1): determining the backlight module structure, the backlight module structure may include a substrate 00, an optical film layer 01, a reflector 02 and a plurality of light-emitting elements 03; the substrate 00 and the optical film layer 01 may be arranged opposite to each other; the light-emitting element 03 may be arranged on the substrate 00 and on the side of the substrate 00 facing the optical film layer 01; the reflector 02 may be located between the substrate 00 and the optical film layer 01. The reflector 02 may include a plurality of reflective structures 021. The reflective structures 021 may surround the light-emitting elements 03; there may be a gap 04 between the reflective structure 03 and the optical film layer 01, and there may be air in the gap 04;

S2): determining the distance P between two adjacent light-emitting elements 03;

S3): determining the distance OD between the substrate 00 and the optical film layer 01 according to the backlight module structure and the distance P between two adjacent light-emitting elements 03; and S4): determining the value range of OD1 according to $$0.4 \le \frac{OD1}{OD} \le 0.6.$$

Along the thickness direction of the backlight module, OD1 is the distance between the end of the reflective structure 021 adjacent to the optical film layer 01 and the optical film layer 01.

Specifically, referring to FIG. 1 and FIG. 16, when designing the structure of a direct-lit backlight module, the structure of the module may be generally determined first. In the present disclosure, the structure of the module may include a substrate 00, an optical film layer 01, a reflector 02 and a plurality of light-emitting elements 03. The substrate 00 and the optical film layer 01 may be arranged oppositely. The light-emitting element 03 may be arranged on the substrate 00 and on the side of the substrate 00 facing the optical film layer 01. The reflector 02 may be located between the substrate 00 and the optical film layer 01. The reflector 02 may include a plurality of reflective structures 021, and the reflective structures 021 may surround the light-emitting element 03. There may be a gap 04 between the reflective structure 03 and the optical film layer 01, and there may be air in the gap 04.

In the step S2, the distance P between the two light-emitting elements 03 may be determined. For this step, after the module architecture is selected, the area of the single partitions may be determined according to the number of single partitions to be divided, and then the spacing between the light-emitting elements 03 may be determined according to the area of the single partitions. For example, in some embodiments of the present disclosure, a single partition may include one light-emitting element 03, and the projection of the outer contour of the reflective structure 021 on the substrate 00 may be a square. Then, the side length of the square may be the distance P between the light-emitting elements 03.

In the step S3, the distance OD between the substrate 00 and the optical film layer 01 may be determined according to the backlight module structure and the distance P between two adjacent light-emitting elements 03. For this step, generally speaking, when the backlight module architecture is determined, the distance OD between the substrate 00 and the optical film layer 01 may be determined based on the distance P between two adjacent light-emitting elements 03.

The distance OD between the substrate 00 and the film layer 01 may need to meet the requirement of covering the bright shadow produced when the light-emitting element 03 emits light. Generally speaking, the larger the OD, the better the effect of covering the bright shadow, but at the same time, the increase in OD may cause the thickness of the product to increase. Therefore, the OD may not be too large. If the OD exceeds a certain value, the OD may continue to increase, which may not contribute much to the picture quality.

In addition, it has been found through practice that the larger the distance P between the two light-emitting elements 03, the larger the required OD value, otherwise it may be difficult to meet the requirement of covering bright shadows. Therefore, after determining the distance P between the two light-emitting elements 03, the present disclosure may determine the OD according to P. At the same time, the OD may not be too large, otherwise it may affect the thickness of the product.

For example, in some embodiments of the present disclosure, for the module structure of a single partition of a light-emitting element 03, the range of OD may be determined according to the formula $$1.95 \le \frac{P}{OD} \le 2.05.$$

In the step S4, according to $$0.4 \le \frac{OD1}{OD} \le 0.6,$$

the value range of OD1 may be determined. Along the thickness direction of the backlight module, OD1 may be the distance between the end of the reflective structure 021 adjacent to the optical film layer 01 and the optical film layer 01.

For this step, OD1 may be determined according to the formula $$0.4 \le \frac{OD1}{OD} \le 0.6$$

after determining OD. The method may be to adjust the height of the reflective structure 021 such that the distance between the reflective structure 03 and the optical film layer 01 may satisfy the formula $$0.4 \le \frac{OD1}{OD} \le 0.6.$$

In this way, without increasing the overall thickness of the backlight module, compared with the existing backlight module structure with zero air layer thickness or small air layer thickness, the proportion of the thickness OD1 of the air layer at gap 04 may be increased by reducing the height proportion of the reflective structure 021 to achieve a good light mixing effect, and reduce or eliminate the dark shadow at one end of the reflective structure 021 facing the optical film layer. Accordingly, the quality of the picture may be improved.

Generally speaking, for the structure shown in the embodiment of the present disclosure, when the value range of OD is 3 mm-7 mm, the value of OD1 may be between 1.2 mm and 4.2 mm. The overall thickness of the backlight module may be between 7.5 mm and 11.5 mm. Thus, compared with the structure shown in FIG. 2, the thickness of the air layer of the present disclosure may be significantly increased, but the overall thickness of the backlight module may be almost the same; and the thickness may still be maintained relatively small, for example, between 7.5 mm and 11.5 mm.

Further, referring to FIG. 1, in some embodiments of the present disclosure, each reflective structure 021 may be arranged around a light-emitting element 03. OD1 may be determined according to the design requirements of the brightness L1 of the light-emitting element and the vertical brightness L2 of the center of the backlight module, and combined with the formula y=a×ln(x)+b. −0.248≤a≤−0.224; and 0.0297≤b≤0.033.

Specifically, for the module structure of a reflective structure 021 arranged around a light-emitting element 03, it has been found that there may be a connection between Y and X. By matching the values of X and Y, the overall picture quality may be improved. Through a large number of experiments, the relationship between the brightness ratio Y of a single partition and the air layer thickness ratio X may be summarized. When the air layer thickness ratio X and the brightness ration Y of a single partition meet a certain functional relationship, i.e., y=a×ln(x)+b, −0.248≤a≤−0.224; and 0.0297≤b≤0.033, the overall quality of the picture may be enhanced.

Figure 17:
FIG. 17 illustrates an exemplary display device according to various disclosed embodiments of the present disclosure.
Figure 18:
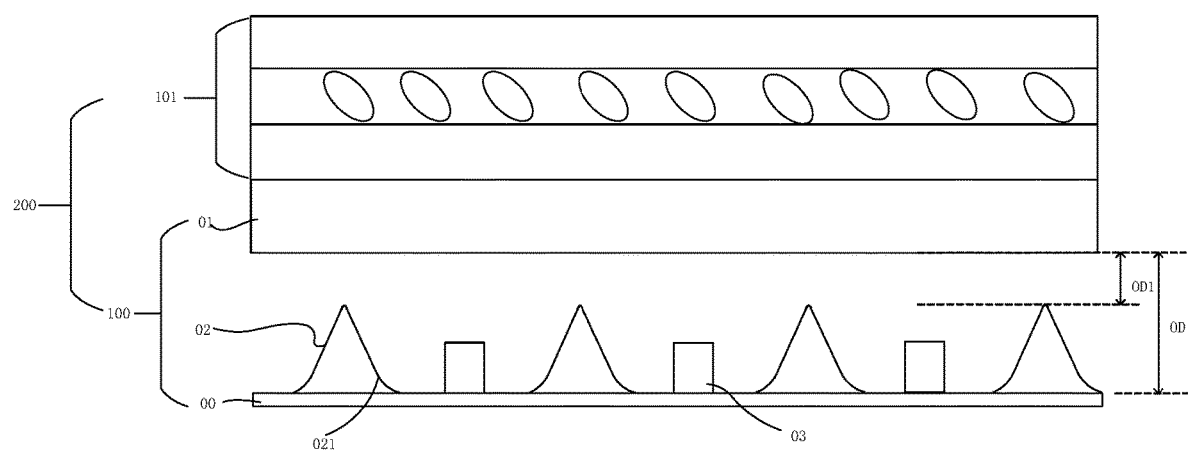
FIG. 18 illustrates a B-B'-sectional view of the display panel in FIG. 17.

The present disclosure also provides a display device. FIG. 17 illustrates a schematic structural diagram of an exemplary display device provided by an embodiment of the present disclosure. FIG. 18 shows a schematic B-B sectional view of the display device in FIG. 17. As shown in FIGS. 17-18, the display device 200 provided in this embodiment may include a direct-lit backlight module 100 provided in any of the above embodiments of the present disclosure. In some embodiments of the present disclosure, the liquid crystal display panel 101 may be located above the direct-lit backlight module 100.

It can be understood that the display device 200 provided by the embodiment of the present disclosure may be a computer, a television, a tablet, a vehicle display screen, or other display device with a display function, and the present disclosure does not specifically limit this. The display device provided by the embodiment of the present disclosure may have the beneficial effects of the display panel provided by the embodiment of the present disclosure. The details may be referred to the specific description of the display panel in the above embodiments, and this embodiment will not be described again here.

In summary, the display panel and display device provided by the present disclosure may at least achieve the following beneficial effects.

By controlling the air layer thickness ratio X, light in different single partitions may be mixed to a certain extent and the transition between different single partitions may be relatively smooth, and the generation of Mura may be avoided. At the same time, by controlling the air layer thickness ratio X, the Halo generated by a single partition may be controlled within a certain range. Accordingly, better picture quality may be produced.

Although some specific embodiments of the disclosure have been described in detail by way of examples, those skilled in the art will understand that the above examples are for illustration only and are not intended to limit the scope of the disclosure. Those skilled in the art will understand that the above embodiments can be modified without departing from the scope and spirit of the disclosure. The scope of the disclosure is defined by the appended claims.

What is claimed is:

1. A direct-lit backlight module, comprising:
a substrate;
an optical film layer;
a reflector; and
a plurality of light-emitting elements,
wherein:
the substrate and the optical film layer are arranged oppositely;
the plurality of light-emitting elements are arranged on a side of the substrate facing the optical film layer;
the reflector is located between the substrate and the optical film layer and includes a plurality of reflective structures surrounding the plurality of light-emitting elements, wherein each reflective structure includes a plurality of sidewalls surrounding one light-emitting element, and there is a first arc-shaped connection member between two adjacent sidewalls along a surrounding direction;
there is a gap between the plurality of reflective structures and the optical film layer, and there is air in the gap;
in the thickness direction of the direct-lit backlight module, a distance between one end of the reflective structure adjacent to the optical film layer and the optical film layer is OD1, and a distance between the substrate and the optical film layer is OD; and $$X = \frac{OD1}{OD}; \text{ and } 0.4 \leq X < 0.6.$$

2. The direct-lit backlight module according to claim 1, wherein:
the light-emitting element is an independently controlled light-emitting element;
L1 is brightness measured when a single light-emitting element is lit;
L2 is vertical brightness measured at a center when all the plurality of light-emitting elements are lit;

$$Y = \frac{L1}{L2}; \text{ and }$$

$$0.15 \leq Y < 0.25.$$

3. The direct-lit backlight module according to claim 2, wherein:

$$Y = a \times \ln(X) + b;$$

$$-0.248 \leq a \leq -0.224; \text{ and }$$

$$0.0297 \leq b \leq 0.033.$$

4. The direct-lit backlight module according to claim 3, wherein:

$$y = -0.236\ln(x) + 0.0314.$$

5. The direct-lit backlight module according to claim 1, wherein the reflective structure comprises:
a reflective cavity,
wherein:
one end of the reflective cavity facing the substrate includes a pocket hole;
another end of the reflective cavity includes a light outlet;
a cross-sectional area of the reflective cavity is gradually expanded in a direction from the pocket hole to the light outlet;
the light-emitting element passes through a corresponding pocket hole and is installed on the substrate;
a light-exiting surface of the light-emitting element faces the light outlet; and
in a direction parallel to a plane of the substrate, two adjacent reflective structures are connected to each other at one end of the light outlet.

6. The direct-lit backlight module according to claim 5, wherein:
an end of the reflective structure provided with the light outlet is hexagonal-shaped.

7. The direct-lit backlight module according to claim 5, wherein the reflective structure further comprises:
a bottom, fixedly connected with the substrate and disposed with the pocket hole.

8. The direct-lit backlight module according to claim 7, wherein:
a second arc connection member is disposed between the bottom and the plurality of sidewalls.

9. The direct-lit backlight module according to claim 1, wherein:
a distance between two adjacent light-emitting elements is P; and $$1.95 \le \frac{P}{OD} \le 2.05.$$

10. The direct-lit backlight module according to claim 9, wherein:
an angle between a surface of the sidewall facing the light-emitting element and the plane of the substrate is α, and 55°≤α≤75°; or
an angle between a tangent line of a surface of the sidewall facing of the light-emitting element and the plane of the substrate is α, and 55≤α≤75°.

11. The direct-lit backlight module according to claim 2, wherein:
a light type of a single partition where the light-emitting element is located is Gaussian-type.

12. The direct-lit backlight module according to claim 1, wherein the optical film comprises:
a diffusion plate arranged opposite to the substrate, wherein OD is the distance between the diffusion plate and the substrate.

13. The direct-lit backlight module according to claim 12, wherein the optical film layer further comprises:
a diffusion sheet;
a light-enhancing film; and
a light-enhancing-like film,
wherein the diffusion sheet is located between the diffusion plate and the light-enhancing film, and the light-enhancing film is located between the diffusion sheet and the light-enhancing-like film.

14. The direct-lit backlight module according to claim 12, wherein:
a material of the diffusion plate includes PC, PS or PMMA; and
a thickness of the diffusion plate is in a range of approximately 1.5 mm-2 mm.

15. The direct-lit backlight module according to claim 1, wherein the light-emitting element comprises:
an electrical connection layer;
a light-emitting layer; and
a diffusion layer,
wherein:
the electrical connection layer is in contact with and electrically connected to the substrate;
the light-emitting layer is located on a side of the electrical connection layer away from the substrate; and
the diffusion layer is disposed on a side of the light-emitting layer away from the substrate.

16. A method of designing a direct-lit backlight module, comprising:
determining a structure of the direct-lit backlight module, wherein the structure of the direct-lit backlight module includes a substrate, an optical film layer, a reflector and a plurality of light-emitting elements; the substrate and the optical film layer are arranged oppositely; the plurality of light-emitting elements are arranged on a side of the substrate facing the optical film layer; the reflector is located between the substrate and the optical film layer; the reflector includes a plurality of reflective structures, and each reflective structure includes a plurality of sidewalls surrounding one light-emitting element, and there is a first arc-shaped connection member between two adjacent sidewalls along a surrounding direction; there is a gap between the reflective structure and the optical film layer, and there is air in the gap;
determining a distance P between two adjacent light-emitting elements of the plurality of light-emitting elements;
determining a distance OD between the substrate and the optical film layer according to the structure of the backlight module and the distance P between the two adjacent light-emitting elements; and
determining a value range of OD1 according to $$0.4 \le \frac{OD1}{OD} \le 0.6,$$

wherein, in a thickness direction of the backlight module, OD1 is a distance between one end of the reflective structure adjacent to the optical film layer and the optical film layer.

17. The method according to claim 16, wherein:
each of the plurality of reflective structures surrounds one of the plurality of light-emitting elements; and
OD1 is determined according to design requirements of brightness L1 of the light-emitting element and vertical brightness L2 of a center of the direct-lit backlight module and combining a formula y=a×ln(x)+b, wherein 0.248≤a≤−0.224; and 0.0297≤b≤0.033.

18. A display device, comprising:
a direct-lit backlight module, including:
a substrate;
an optical film layer;
a reflector; and
a plurality of light-emitting elements,
wherein:
the substrate and the optical film layer are arranged oppositely;
the plurality of light-emitting elements are arranged on a side of the substrate facing the optical film layer, wherein each reflective structure includes a plurality of sidewalls surrounding one light-emitting element, and there is a first arc-shaped connection member between two adjacent sidewalls along a surrounding direction;
the reflector is located between the substrate and the optical film layer and includes a plurality of reflective structures surrounding the plurality of light-emitting elements;
there is a gap between the plurality of reflective structures and the optical film layer, and there is air in the gap;
in the thickness direction of the direct-lit backlight module, a distance between one end of the reflective structure adjacent to the optical film layer and the optical film layer is OD1, and a distance between the substrate and the optical film layer is OD; and $$X = \frac{OD1}{OD}; \text{ and } 0.4 \leq X < 0.6.$$

* * * * *